United States Patent [19]

Peeters et al.

[11] 3,932,781

[45] Jan. 13, 1976

[54] HIGH PRESSURE SODIUM VAPOR DISCHARGE LAMP

[75] Inventors: Peeters, Jozef C. I.; De Roeck, Lucien Joannes Maria; and Van Boort, Henricus Johannes Joseph; all of the Netherlands

[73] Assignee: U.S. Philips Corporation, New York, N.Y.

[22] Filed: February 26, 1973

[21] Appl. No.: 335,561

Related U.S. Application Data

[63] This application is a continuation of Ser. No. 133,814, April 14, 1971, now abandoned.

[52] U.S. Cl. ............................. 313/25, 313/113, 313/184, 313/227
[51] Int. Cl.² ..................... H01J 61/22, H01J 61/52
[58] Field of Search .................. 313/25, 27, 313/184, 113, 227

[56] References Cited
UNITED STATES PATENTS

| | | | |
|---|---|---|---|
| 3,363,134 | 1/1968 | Johnson | 313/25 X |
| 3,610,983 | 10/1971 | Grabner et al. | 313/25 |
| 3,453,477 | 7/1969 | Hanneman et al. | 313/184 |
| 3,619,682 | 11/1971 | Lo et al. | 313/184 X |
| 2,252,474 | 8/1941 | Spanner | 240/37.1 |
| 2,114,175 | 4/1938 | Cartun | 313/25 X |
| 2,562,887 | 8/1951 | Beese | 313/113 X |
| 2,240,353 | 4/1941 | Schnetzler | 313/229 X |
| 3,259,777 | 7/1966 | Fridrich | 313/184 |
| 3,662,203 | 5/1972 | Kuhl et al. | 313/25 |

*Primary Examiner*—Palmer C. Demeo
*Attorney, Agent, or Firm*—Frank R. Trifari

[57] ABSTRACT

The invention relates to a high-pressure sodium vapor discharge lamp provided with a discharge tube and an outer envelope encompassing this tube.

In a known lamp vacuum or a gas at a very low pressure was present between the outer envelope and the discharge tube. A drawback thereof was that in case of overload material rapidly evaporated from the wall of the discharge tube and was deposited on the inner side of the outer envelope. This led to a decline in the luminous efficiency.

In a lamp according to the invention gas at a pressure of at least 200 Torr is present between the outer envelope and the discharge tube. An advantage thereof is that the material of the discharge tube less rapidly evaporates in case of overload. A further advantage of this lamp is that it is particularly suitable to be operated at a high current so that much light can be generated with this lamp (that is to say, a high lumen value can be obtained).

4 Claims, 3 Drawing Figures

INVENTOR.
JOZEF C. I. PEETERS
LUCIEN J. M. DE ROECK
BY HENRICUS J. J. VAN BOORT

AGENT

HIGH PRESSURE SODIUM VAPOR DISCHARGE LAMP

This is a continuation of application Ser. No. 133,814, filed April 14, 1971, now abandoned.

The invention relates to a high pressure sodium vapor discharge lamp provided with a discharge tube and an outer envelope encompassing this tube, the wall of the discharge tube consisting of densely sintered aluminum oxide and an internal electrode being present near each of the two ends of the tube, an inert gas being present between the discharge tube and the outer envelope.

A high pressure sodium vapor discharge lamp is to be understood to mean a lamp in which the partial sodium vapor pressure in the discharge tube is at least 20 Torr.

A high pressure sodium vapor discharge lamp of the kind mentioned above is described, for example, in the Netherlands Patent Application 6,803,905. In one embodiment described in that Dutch patent application argon under a low pressure (less than $10^{-1}$ Torr) is present between the discharge tube and the outer envelope. A drawback of this known lamp is that it is less suitable for overload because the hot densely sintered aluminum oxide is partly evaporated from the wall of the discharge tube during operation and is deposited on the inner side of the outer envelope. This deposit leads to a decline in the lumen value of the lamp.

An object of the present invention is to obviate or at least to mitigate the evaporation of the densely sintered aluminum oxide.

According to the invention, a high pressure sodium vapor discharge lamp provided with a discharge tube and an outer envelope encompassing this tube, in which the wall of the discharge tube consists of densely sintered aluminum oxide and in which an internal electrode is present near each of the two ends of the tube, an inert gas being present between the discharge tube and the outer envelope is characterized in that the pressure of the inert gas is more than 200 Torr.

An advantage of this lamp is that due to the relatively high pressure of the gas between the outer envelope and the discharge tube the densely sintered aluminum oxide is less rapidly evaporated from the wall of the discharge tube in case of overload (or at a higher operating temperature of the discharge tube obtained in a different manner). As a result a smaller quantity of this densely sintered aluminum oxide is deposited on the inner side of the outer envelope so that the decline in the lumen value is slighter.

The inert gas may be a rare gas, for example, argon. It is alternatively feasible that in some cases nitrogen is used as an inert gas. Where the outer envelope is to be sealed also in an inert gas atmosphere, the composition of this atmosphere will be preferably the same as that of the future filling of the outer envelope, for this simplifies the manufacture of this lamp.

The outer envelope of the lamp may have, for example, an allyptical longitudinal section. It is alternatively feasible that the outer envelope is circular cylindrical. The distance between the outer envelope and the discharge tube may be, for example, several cms.

The use of an inert gas at a pressure of more than 200 Torr between the outer envelope and the discharge tube means that the discharge tube is cooled more than when the pressure of the gas is lower than $10^{-1}$ Torr or when the space between the outer envelope and the discharge tube is substantially a vacuum.

To compensate for this cooling different methods may be used. Thus, for example, by reducing the distance between one electrode and the nearest end of the discharge tube, the temperature of the coldest spot in the discharge tube may be increased. It is alternatively possible to increase the temperature of the coldest spot near this end of the discharge tube by means of other heat insulating steps. The dimensions of the outer envelope may alternatively be reduced.

In a special case a method of compensating for cooling is used in which nothing need be changed in the lamp itself. This will be further described hereinafter.

A first preferred method of operating a high pressure sodium vapor discharge lamp according to the invention is characterized in that the lamp current is chosen to be such that the condition: W/A is no less than 22 is satisfied; in which W is the number of Watts taken up by the lamp and A is the surface (in sq. cm) of the inner wall of the discharge tube.

An advantage of this method is that the cooling, as a result of the gas in the outer envelope, is compensated for by a larger lamp current. This situation leads to a lamp in which a relatively small decline in the lumen value is accompanied by a relatively large luminous flux.

A second method of compensating for the cooling of the discharge tube, as a result of the gas between the outer envelope and the discharge tube, is to use a lamp according to the invention in a substantially closed lighting fitting.

An advantage thereof is that due to the closed atmosphere in the interior of the fitting the entire lamp is less strongly cooled and consequently the discharge tube of the lamp may still get an operating temperature satisfactory for its operation, which means a higher operating temperature than when the lamp would have been suspended in free air.

As already noted the distance between the outer envelope and the discharge tube might be, for example, several cms.

Preferably the distance between the discharge tube and the outer envelope is not more than 5 mms if the outer envelope is elongated and made of quartz if the outer envelope is oblong in a high pressure sodium vapor discharge lamp according to the invention.

An advantage of this embodiment is that the lamp may have a relatively small diameter and yet exhibit a small decline in the lumen value, due to the gas in the outer envelope. The relatively small diameter of the outer envelope furthermore leads to an economy in material and to a space economy. The latter is especially important when such a lamp is to be used in a small fitting. Such a slender lamp also provides greater freedom in the choice of an optical system to be used in combination therewith and hence in the light distributions to be realized.

The discharge tube may be resiliently supported relative to the outer envelope by separate resilient mechanisms.

In an advantageous embodiment of a high pressure sodium vapor discharge lamp according to the invention in which the outer envelope is elongated and in which current lead-through members are passed through the two ends of the outer envelope and in which one current lead-through member is electrically connected to one electrode of the discharge tube and the other current lead-through member is electrically connected to the other electrode of the discharge tube, the portions of the electrical connections located between the outer envelope and the discharge tube are formed as spiral-shaped centering members whose outer sides engage the inner side of the outer envelope.

An advantage of this preferred embodiment is that the current supply members of the electrodes are now also centering members of the discharge tube. This preferred embodiment is very advantageous particularly in the case of a relatively slender discharge tube in which the distance between the outer envelope and the discharge tube is less than 5 mms.

As regards the aspect of the method, the invention of course also relates to the operation of the said preferred embodiments of high pressure sodium vapor discharge lamps at a lamp current which is such that the said condition:

W/A is no less than 22 is satisfied; in which W is the number of Watts taken up by the lamp and A is the surface (in sq. cm) of the axial section the inner wall of the discharge tube intermediate the electrodes.

The invention also relates to the use of the preferred embodiments of high pressure sodium vapor discharge lamps in substantially closed lighting fittings.

In order that the invention may be readily carried into effect, some embodiments thereof will now be described in detail, by way of example, with reference to the accompanying diagrammatic drawings, in which.

Figure 1:
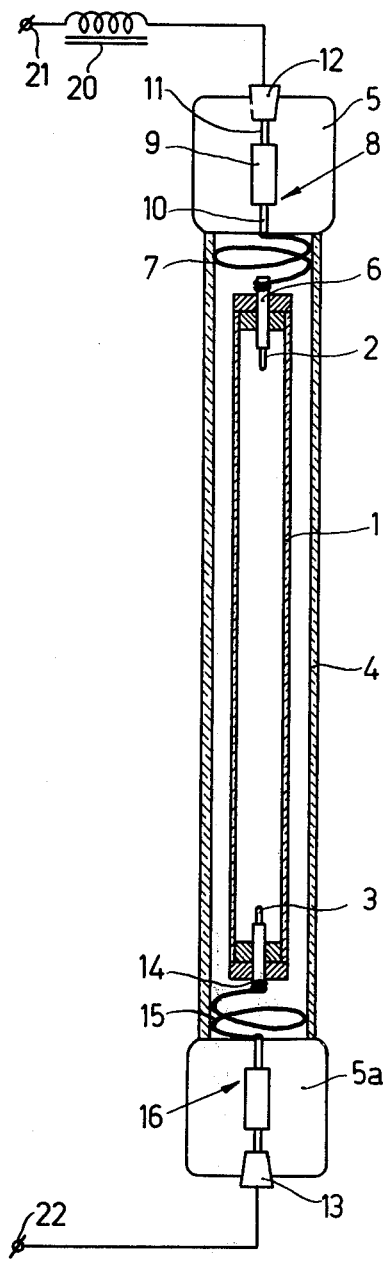
FIG. 1 shows a high-pressure sodium vapor discharge lamp according to the invention, as well as a supply circuit for this lamp.

In FIG. 1 the reference numeral 1 denotes a discharge tube of densely sintered aluminum oxide. One end of the tube 1 is provided with an internal electrode 2 and the other end is provided with an internal electrode 3. Both ends of the discharge tube 1 are closed in a manner as described, for example, in the Netherlands patent application 6,704,681. The discharge tube 1 is encompassed by an outer envelope of quartz which is denoted by the reference numeral 4. Argon at a pressure of approximately 700 Torr is present between the discharge tube 1 and the outer envelope 4. Both ends of the outer envelope 4 have flat pinches which are denoted by the reference numerals 5 and 5a, respectively. The electrode 2 of the discharge tube 1 is mounted on a current lead-through tube 6. The reference numeral 7 denotes a spiral-shaped centering member of molybdenum wire which connects the lead-through tube 6 to a current lead-through member 8. This lead-through member 8 is present in the pinch 5. The element 7 functions on the one-hand as an electrical conductor and on the other hand as a centering member for the discharge tube 1 in the outer envelope 4. The current lead-through member 8 consists of different parts, namely a central part 9 representing a molybdenum foil, and furthermore wire-shaped parts 10 and 11. The reference numeral 12 denotes a current connection part. The electrode 3 is connected, in substantially the same manner as is indicated with reference to electrode 2, to a current connection part 13, namely through a current lead-through part 14, a spiral-shaped centering member 15 and a current lead-through member 16 consisting of three portions in the quartz pinch 5a. The current connection part 12 is connected through an inductance 20 to a connecting terminal 21. The current connecting part 13 of the discharge lamp is connected to a connecting terminal 22. The terminals 21 and 22 are connected, for example, to the two terminals of an alternating voltage mains of, for example, 220 Volts, 50 Hz. A possibly required starter for igniting the lamp is not shown in the circuit.

Figure 2:
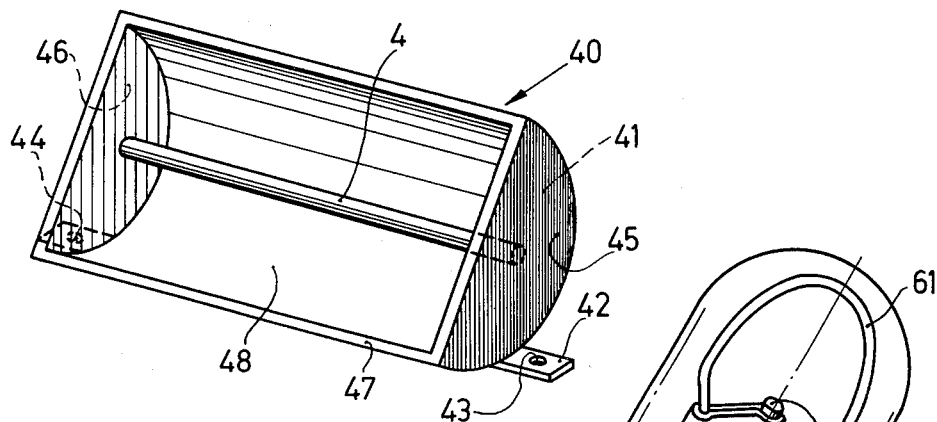
FIG. 2 shows the lamp of FIG. 1 mounted in a substantially closed lighting fitting.

In FIG. 2 the reference numeral 4 again denotes the outer envelope of the discharge lamp which is shown in FIG. 1. Further details of this lamp are not shown due to the smaller scale in FIG. 2. A fitting 40 includes a semicylindrical portion 41 which is connected to a mounting strip 42 provided with mounting holes 43 and 44, respectively. Furthermore, there are provided two semicircular end parts of the fitting which are denoted by the reference numerals 45 and 46, respectively. The reference numeral 47 denotes a frame in which a light-transmitting cover glass 48 is incorporated. The frame 47 and the cover glass 48 are rotatably arranged in order to get access to the interior part of the fitting 40, for example, to exchange the lamp for a new specimen. Electric supply members are not shown in the figure of the fitting.

In one embodiment the lamp mounted in the fitting 40 (see FIGS. 1 and 2) had a length of approximately 190 mms. The distance between the outer side of the discharge tube 1 and the inner side of the outer envelope 4 was one mm (that is to say, less than 5 mms).

In the arrangement of FIG. 2 the lamp (of FIG. 1) was suitable for 400 Watts.

Figure 3:
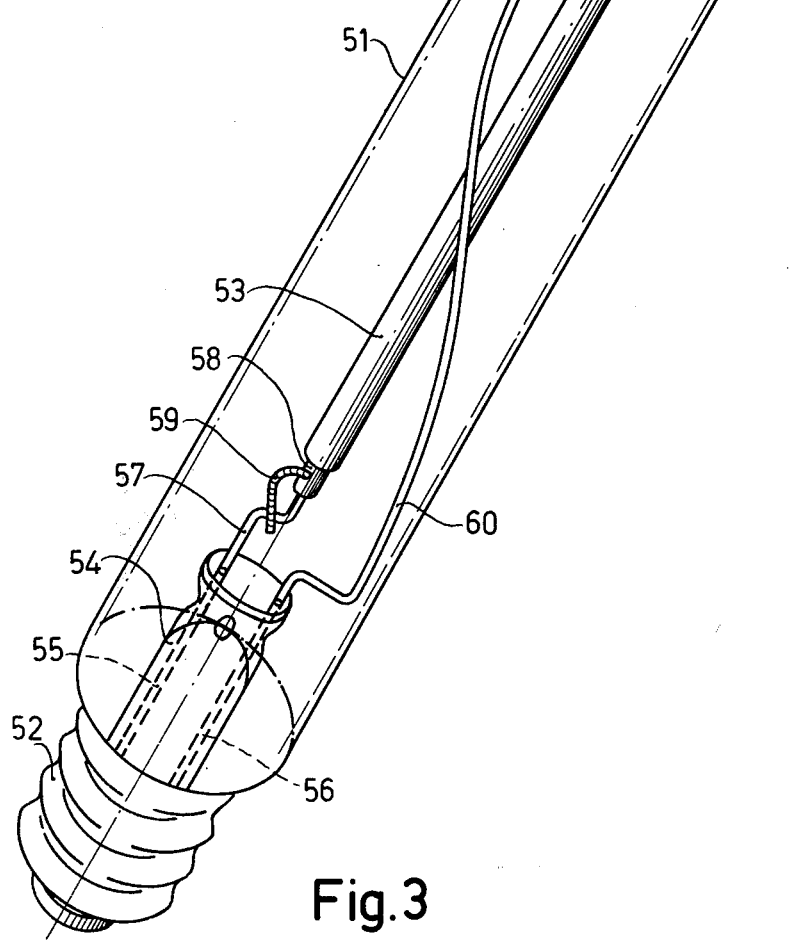
FIG. 3 is a perspective view of a second high pressure sodium vapor discharge lamp according to the invention.

In FIG. 3 the reference numeral 51 denotes a glass outer envelope of a high-pressure sodium vapor discharge lamp. In this case a lamp of approximately 700 Watts having a length of approximately 27 cms was used. The reference numeral 52 denotes a lamp cap; the reference numeral 53 denotes a discharge tube of densely sintered aluminum oxide in the outer envelope 51. The reference numeral 54 denotes a pinch through which two electrical supply conductors 55 and 56 are passed. Supply conductors 55 is connected to a conductor 57 which is loosely inserted at the other end into a tubular current supply member 58 present at one end of the discharge tube 53. A stranded wire 59 which is in electrical contact with the outer circumference of the current supply member 58 is secured to conductor 57. Supply conductor 56 is connected to a terminal wire which consists of a helical portion 60 and a convolute portion 61. A rigid current supply strip 62, which is connected to a tubular current supply member 63 of the discharge tube 53, is connected to the portion of the helical part 60 facing the convolute part 61. The convolution 61 engages the semiconvex end part of the outer envelope 51. In one embodiment the diameter of the outer envelope (51) was 46 mms and the diameter of the discharge tube (53) was 9.5 mms. The length of the discharge tube (53) was approximately 115 millimeters. The space between the discharge tube 53 and the outer envelope 51 was filled with argon at a pressure of approximately 700 Torr.

Several measurements were performed on the arrangement of FIG. 2 and on the lamp of FIG. 3. Also comparative measurements were performed on a known lamp. As regards the dimensions this known lamp corresponded to the lamp shown in FIG. 3. (Only the distance from the top of the electrode to the bottom of the discharge tube was slightly differently adjusted.) However, in the known lamp the space between the outer envelope and the discharge tube was vacuum. Due to the absence of gas in the outer envelope the known lamp could only be loaded to approximately 400 Watts. In fact, when the wattage was chosen to be still higher, a quick evaporation of the densely sintered aluminum oxide from the discharge tube took place which led to a great decline in the lumen value.

The results of the measurements are summarized in the table below:

TABLE

| Situation No. | Re | Adjusted power input of the lamp (Watts) | Light output (lumens) |
| --- | --- | --- | --- |
| 1 | Lamp in the fitting of Fig. 2. | 400 | 40500 |
| 2 | Known lamp (not according to the invention). | 400 | 40500 |
| 3 | Lamp of Fig. 3 | 700 | 73500 |

NOTE

The situations Nos. 1 and 3 relate to lamps according to the invention: on the other hand in situation No. 2 a known lamp is included as a basis for comparison.

The table shows among other things that the slender lamp of situation No. 1 is equally satisfactory as the known lamp of situation No. 2 from a light technical point of view. This proves that the same results can be obtained for a smaller lamp by using the present invention.

The table furthermore shows (compare situations Nos. 2 and 3) that the use of the present invention creates the possibility for a high-pressure sodium vapor discharge lamp of a given construction to emit much more light.

In situation No. 3, the ratio W/A = 700/20 = 35 in which W was the number of Watts taken up by the lamp and A was the area of the axial section of internal surface of the discharge tube 53 (in sq. cm) intermediate the electrodes. The area of 20 sq. cm. is arrived at by multiplying the inside diameter of the tube 53 (.765 cm.) by the distance between electrodes 2, 3 (27.5 cm) and 3.14.

A great advantage of the lamp of FIG. 1 is further that due to the small transverse dimensions, that is to say its great slenderness, a considerable economy in material of the outer envelope is obtained as compared with the known outer envelopes for these kinds of lamps.

What is claimed is:

1. A high-pressure sodium vapor discharge lamp comprising:
    a discharge tube having an internal electrode at each end of said tube, the wall of said discharge tube consisting of densely sintered alumina;
    an outer envelope encompassing said tube;
    an inert gas being present between the discharge tube and the outer envelope, the pressure of said gas being greater than 200 Torr; and
    means for supplying a current to said lamp satisfying the condition that W/A is more than 22 in which W represents the number of watts utilized by the lamp and A represents the surface in square centimeters of the axial section of the inner wall of the discharge tube intermediate to said electrodes.

2. A high-pressure sodium vapor discharge lamp comprising:
    a discharge tube having an internal electrode at each end of said tube, the wall of said discharge tube consisting of densely sintered alumina;
    an outer quartz envelope encompassing said tube, the distance between the tube and envelope being no greater than 5 mm, and
    an inert gas being present between the discharge tube and the outer envelope, the pressure of said gas being greater than 200 Torr.

3. In combination with the lamp of claim 2, a substantially closed lighting fixture having a housing portion and a light transparent cover portion, said lamp being mounted within the fixture, said closed fixture being adapted to raise the operating temperature of the lamp above that temperature obtainable by operating the lamp in free air.

4. A high-pressure sodium vapor discharge lamp comprising:
    a discharge tube having an internal electrode at each end of said tube, the wall of said discharge tube consisting of densely sintered alumina;
    an outer quartz envelope encompassing said tube, the distance between the tube and envelope being no greater than 5 mm; and
    an inert gas being present between the discharge tube and the outer envelope, the pressure of said gas being greater than 200 Torr;
    further including current lead-through members extending through the two ends of the outer envelope, one said current lead-through members being electrically connected to one electrode of the discharge tube and the other current lead-through member being electrically connected to the other electrode and wherein the parts of the electrical connections located between the outer envelope and the discharge tube are formed as spiral shaped centering members having outer sides which engage the inner side of the outer envelope.

* * * * *

UNITED STATES PATENT AND TRADEMARK OFFICE
CERTIFICATE OF CORRECTION

PATENT NO. : 3,932,781

DATED : January 13, 1976

INVENTOR(S) : PEETERS, JOSEF C.I.; DeROECK, LUCIEN J.M.; VAN BOORT, HENRICUS J.J.

It is certified that error appears in the above-identified patent and that said Letters Patent are hereby corrected as shown below:

IN THE TITLE PAGE

Under Section [63] it should read as follows:

--[30]     FOREIGN APPLICATION PRIORITY DATA
        April 24, 1970     NETHERLANDS........7005964--.

Signed and Sealed this eighth Day of June 1976

[SEAL]

Attest:

RUTH C. MASON
*Attesting Officer*

C. MARSHALL DANN
*Commissioner of Patents and Trademarks*